United States Patent [19]
Feige et al.

[11] Patent Number: 5,994,252
[45] Date of Patent: Nov. 30, 1999

[54] PROCESS FOR PRODUCING SPHERICAL METAL-OXIDE POWDER PARTICLES

[75] Inventors: Reinhard Feige, Bonn; Friedhelm Bramsiepe, Pocking, both of Germany

[73] Assignee: RW silicium GmbH, Pocking, Germany

[21] Appl. No.: 09/166,366

[22] Filed: Oct. 5, 1998

Related U.S. Application Data

[62] Division of application No. 08/800,270, Feb. 13, 1997, Pat. No. 5,856,254.

[30] Foreign Application Priority Data

Feb. 15, 1996 [DE] Germany ............... 196 05 556
Feb. 15, 1996 [DE] Germany ............... 196 05 536

[51] Int. Cl.$^6$ ............... C04B 35/10; C03C 12/00
[52] U.S. Cl. ............... 501/128; 501/33; 501/119; 106/3; 159/47.1; 264/5; 264/12; 51/309
[58] Field of Search ............... 501/128, 33, 119, 501/127; 106/3; 159/47.1; 264/5, 12; 51/309

[56] References Cited

U.S. PATENT DOCUMENTS

| | | | |
|---|---|---|---|
| 2,862,792 | 12/1958 | Rehm | 23/182 |
| 4,472,173 | 9/1984 | Bruning et al. | 51/298 |
| 4,952,389 | 8/1990 | Szymanski et al. | 501/118 |
| 5,042,991 | 8/1991 | Kunz et al. | 51/295 |
| 5,268,101 | 12/1993 | Anderson et al. | 501/12 |
| 5,424,260 | 6/1995 | Yerushalmi et al. | |
| 5,618,580 | 4/1997 | Oshima et al. | 427/212 |

FOREIGN PATENT DOCUMENTS

| | | |
|---|---|---|
| 387748 | 9/1990 | European Pat. Off. . |
| 601453 | 6/1994 | European Pat. Off. . |
| 677326 | 10/1995 | European Pat. Off. . |
| 538477 | 11/1955 | France . |
| 1941011 | 2/1970 | Germany . |
| 3147597 | 2/1983 | Germany . |

OTHER PUBLICATIONS

Journal of Materials Science (Letters) Bd. 16, 1981 Seiten 1716–1719, XP002032012.

*Primary Examiner*—Karl Group
*Attorney, Agent, or Firm*—Collard & Roe, P.C.

[57] ABSTRACT

There is a process for producing spherical metal-oxide powder particles. They are used as finely ground raw and filler materials in mineral, ceramic and refractory construction, technical and auxiliary materials, as well as for polishing and grinding agents.

12 Claims, 1 Drawing Sheet

PROCESS FOR PRODUCING SPHERICAL METAL-OXIDE POWDER PARTICLES

CROSS-REFERENCE TO RELATED APPLICATION

This patent application is a divisional patent application of U.S. patent application Ser. No. 08/800,270 filed Feb. 13, 1997 now U.S. Pat. No. 5,856,254.

BACKGROUND OF THE INVENTION

1. Field of the Invention

The present invention relates to spherical metal-oxide powder particles, which are used as finely ground raw material and filler materials in mineral, ceramic and refractory construction, technical and auxiliary materials, as well as for polishing and grinding agents, and to a process for producing such powder particles, as well as to the application of this process for treating ceramic and refractory residual materials.

2. The Prior Art

According to the prior art, ceramic and refractory residual materials are treated by sorting, crushing and classifying. If the purity is high enough, recycling may take place, otherwise, only disposal as waste in a waste dump is possible.

Special problems are caused in connection with mechanical treatment by residual materials in which there is a fusion product of metallic aluminum and its alloying components which are present. These fusion products result from melting and casting factory installations within the aluminum industry, for example such as metal-contaminated refractory furnace refuse, or refuse from ceramic liquid-metal filters or aluminun dross. This waste material, following meltdown with salts, which permits partial recovery of the aluminum, and subsequent leaching out of the salts of the melt with water, again lead to environmental problems. This also leads to sludge residues which, because of their content of aluminum nitride and metallic components of aluminum alloys, release ammonia and hydrogen. Furthermore, also residual substances of ceramic and metal composite materials (e.g. aluminum reinforced by SiC-particles or $Al_2O_3$ fibers, or Al-bonded $Al_2O_3$, silicon nitride-bonded SiC, or Si-bonded SiC) pose problems in the mechanical treatment.

In connection with mineral, ceramic and refractory building and technical materials, the mechanical strength is important. It is influenced by the size and shape of any defective areas in the structure. Therefore, with construction and technical materials which are produced from powders, the objective is to minimize the size and form of such defects by using powder particles with a particle size as fine as possible, and preferably in the spherical form. Since the powders are, as a rule, mixed with water for processing, ball-shaped powder particles with a narrow distribution of the particle size are ideal particularly with respect to the rheological behavior.

With refractory applications, thermal stability, heat insulation stability, resistance to temperature changes and resistance to corrosion are also required in addition to mechanical strength. Metal-oxide materials based on aluminum silicates (such as mullite, sillimanite, cyanite, bauxite), or magnesium aluminate (spinel), and calcium aluminates (refractory concrete) are used in such applications as well. For their manufacture, powder particles with a hollow interior structure (hollow spheres in the ideal case) are particularly advantageous with respect to heat insulation capability.

According to the state of the art, it is possible to produce metal-oxide powder particles containing or forming mullite, spinel, or calcium aluminates, by finely grinding suitable raw materials, mixing them, and pelletizing or pressing them into shaped blanks of centimeter size. Subsequently, sintering and melting can be carried out in rotary tubular kilns, shaft or tunnel kilns, or in arc furnaces. This results in particulate intermediate products of >1 mm, from which powder particles are obtained by subsequent grinding and classifying. Powder particles produced in this way always have a splintery grain form. Moreover, the limits of technical possibilities are reached when grinding and classifying powders in the range of below 5 $\mu$m.

Wet chemical precipitation techniques (e.g. sol gel) are known by which it is possible also to produce spherically shaped, metal-oxide composite powders of less than 5 $\mu$m in diameter. Following drying, however, such powders still contain a substantial amount of chemically bonded water and, therefore, have to be converted into the oxide form by heating (calcining). However, when calcining powder particles smaller than 5 $\mu$m in diameter, it is not possible to avoid agglomerations and sinterings, which change the shape of the grain.

A process for recycling aluminum oxide from aluminum oxide waste and refuse portions is described in U.S. Pat. No. 5,424,260 (1), whereby non-metallic products such as 40–75% by weight $Al_2O_3$, 5–20% by weight MgO, and 2–15% by weight $SiO_2$ are collected, and possibly also trace elements in the form of titanium, copper, zinc, potassium, sulphur, calcium and sodium. Depending on the composition of the refuse, a temperature between 1800° F. and 3500° F. is selected in order to convert the components of the mixture into a molten phase. From the molten phase, either amorphous, noncrystalline structures are obtained by rapid cooling, or crystalline structures are obtained by very gradual cooling. Following grinding, the products can be used as abrasives.

It is known, furthermore, to produce spherically shaped mineral particles by atomizing melts, forming hollow spheres in this process as well. A drawback of the process technique lies in the fact that the hollow spheres produced thereby have a wide grain size distribution in the millimeter-range (e.g. 0.5 to 3 mm), and that the wall of the sphere is so thin that it breaks easily. Such hollow particles require much preparation water when processing them into cement-bonded construction materials.

WO 91/10629 (2) and WO 92/10629 (3) describe processes for treating residual materials in the aluminum industry such as aluminum wastes, in which sintered refractory spinel or mullite products are manufactured by adding magnesium oxide or silicon oxide, and are then crushed to a particle size of 5 to 50 $\mu$m.

JP 63185803 (4) describes a process for producing spherically shaped metal-oxide composite powders with >85% particles in the diameter range of 0.02 to 0.30 $\mu$m. Subsequently, powdery metal alloys (Mg—Al or Al—Si or Mg—Si) are charged into a reaction chamber with oxygen and evaporated there at 1200° C. Following cooling, spherical powders are formed consisting of spinel (MgO•$Al_2O_3$) or mullite (3$Al_2O_3$•2$SiO_2$) or forsterite (2MgO•$SiO_2$), which are suitable for producing pigments, fillers, sintering materials, and as sintering aids.

Condensed silicon oxides are known from the carbothermal production of silicon metal and silicon alloys. The particles of such silicon oxides are spherical and have a diameter in the range of 0.04 to 0.5$\mu$, a specific BET-surface between 6.2 and 18.5 $m^2/g$, as well as a density of 2.21 to 3.13 $g/cm^3$. (P. Aitcin et al: *Ceramic Bulletin*, 63, 1984, pp. 1487–1491 (5)).

DE 4,241,625 (6) and EP 601,453 (7) describe a process for producing sintering-active, largely spherical aluminum oxide with an average particle diameter of less than 1 µm, preferably of less than 0.5 µm. In this process, an aluminum carrier such as metallic aluminum or aluminum oxide is evaporated in a furnace. Following the subsequent oxidation in a gas stream, an aluminum oxide powder is separated using a filter, such powder having a density of 2.5 to 3.97 $g/cm^3$ and a specific BET surface of 0.5 to 60 $m^2/g$.

SUMMARY OF THE INVENTION

It is an object of the present invention to develop particularly for refractory and thermally insulating construction and technical materials finely ground, powdery raw and filler materials having good processibility and low density.

The above object is achieved by the spherical and spherically shaped metal-oxide powder particles containing 35% to 95% by weight $Al_2O_3$, and at least one metal oxide selected from the group consisting of $SiO_2$, MgO, and CaO, said particles having (a) a crystalline phase of a transition aluminum oxide; (b) a microstructure of a melt predominantly solidified in a glassy-amorphous way; (c) a size distribution in which more than 50% by weight of the powder particles have a diameter in the range of 0.2 to 2 µm; and (d) a carbon content of 0.1% to 3% by weight, with all percents by weight based upon the total particle composition weight.

The powder particles according to the invention exhibit high reactivity because of their content of the transition phase of aluminum oxide. This result came as an unexpected and major surprise because the starting composition of the materials used was focused on the formation of crystalline compounds of aluminum oxide with other oxides such as silicon oxide, magnesium oxide, and calcium oxide.

The scope of the application of the powder particles can be expanded because of the component of the transition phase of aluminum oxide contained therein, and because of their reactivity. The term reactivity is, in the present context, understood to mean the setting rate of cement-bonded construction materials, and also the improvement in the ceramic sintering activity.

The above object is also achieved by a process for producing spherical and spherically shaped, metal-oxide powder particles which have a composition of 35% to 95% by weight $Al_2O_3$, and at least one of the oxides $SiO_2$, MgO, CaO, have the crystalline phase of a transition aluminum oxide, the micro-structure of a melt predominantly solidifying in a glassy-amorphous way, a size distribution at which more than 50% by weight of the powder particles have a diameter in the range of 0.2 to 2 µm, and which have a carbon content of 0.1% to 3% and a specific BET-surface of 3 to 15 $m^2/g$. The density of the particles calculated based on the specific BET-surface and the average particle diameter comes to less than 1.5 $g/cm^3$.

This process comprises the steps of (a) reducing aluminum oxide and at least one metal oxide selected from the group consisting of $SiO_2$, MgO and CaO carbothermally and evaporating the materials used to produce evaporated products; (b) oxidizing the evaporated products by mixing with air or oxygen in a gas stream, and condensing as melt particles; (c) cooling the melt particles further in the gas stream and solidifying to form metal-oxide powder particles; and (d) separating the powder particles from the gas stream via a dust filter.

In this composition, all percents by weight are based upon the total composition weight. Thus, there can be from 6% to 55% by weight $SiO_2$; 1% to 32% by weight of MgO; and from 0.29% to 35% by weight CaO in the composition.

For spherical particles, the density can be calculated based on the specific BET-surface and the mean particle size according to the formula:

$$D = 6/O \cdot d50,$$

wherein
D = density in $(g/cm^3)$
O = specific BET-surface $(m^2/g)$
d50 = mean particle diameter (µm)

Accordingly, the following examples show that the powder particles according to the invention have a density of less than 1.5 $g/cm^3$.

The exact spherical shape of the particles can be shown by testing with, the transmission electron microscope (TEM).

The particle distribution is measured by laser diffraction (Cilas granulometer 850, aqueous dispersion, 0.1% Na-pyrophosphate, ultrasound dispersing 30 s). single-point measurement by means of the Stroehlein areameter is applied for measuring the specific BET-surface.

Preferably, the particles have a center core zone with a hollow-space structure. This finding has been demonstrated by analyzing polished sections by raster scan electron microscope (REM).

X-ray diffraction measurements (XRD) show that the particles produced accord ing to the invention surprisingly contain the crystalline phase of the gamma-aluminum oxide. However, it was all the more unexpected because one would expect crystalline compounds containing aluminum oxide in combination with silicon oxide, magnesium oxide and calcium oxide in light of the composition.

In a preferred embodiment, the process of this invention will produce spherical metal oxide powder particles, wherein there is from 42% to 85% by weight of $Al_2O_3$; from 2% to 55% by weight of $SiO_2$; from 0.1 to 34% by weight of MgO; from 0.1% to 31% by weight of CaO; from 0.1% to 0.7% by weight of $Fe_2O_3$; from 0.2% to 0.6% by weight of $Na_2O$; from 0.1% to 0.8% by weight of $K_2O$; and from 0.7% to 2.5% by weight of C, with all percents by weight based upon the total particle composition weight.

The term "hollow-space structure" in the core zone describes the following condition of the powder particles: spongy, multi-pored, or hollow-spherical. Their exact properties are determined based on the specified density and the BET-surface.

BRIEF DESCRIPTION OF THE DRAWING

Other objects and features of the present invention will become apparent from the following detailed description considered in connection with the accompanying drawing which discloses several embodiments of the present invention. It should be understood, however, that the drawing is designed for the purpose of illustration only and not as a definition of the limits of the invention.

The one FIGURE shows the process according to the invention for producing the spherically shaped, metal-oxide powder particles in a graphical sequence which comprises the following steps, using these reference characters throughout.

DETAILED DESCRIPTION OF PREFERRED EMBODIMENTS

Figure 1:
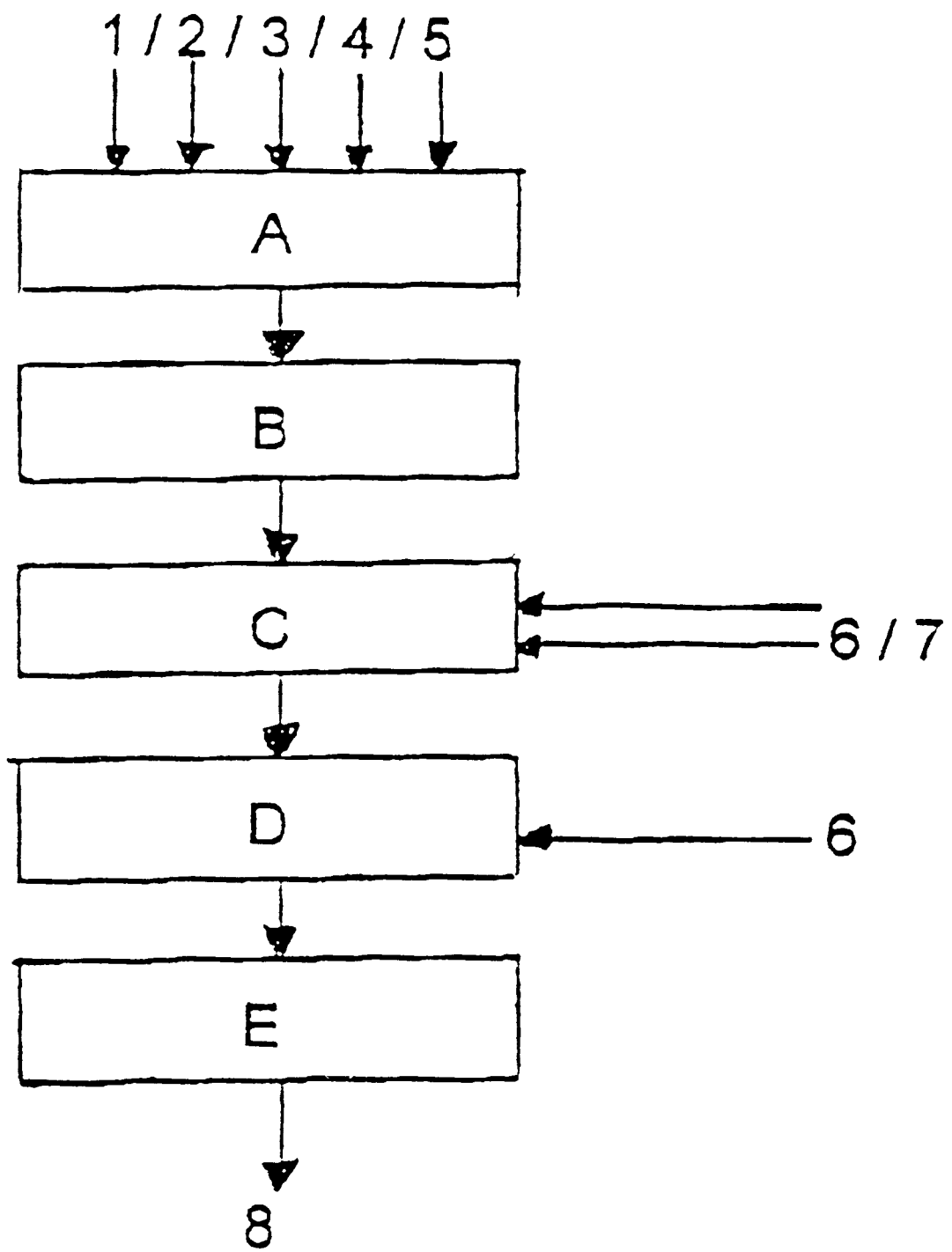

Turning now in detail to the drawings, the FIGURE shows the first step (1) in which oxides of aluminum, silicon, magnesium and calcium, or substances (natural or synthetic raw materials such as bauxite, sillimanite, cyanite, andalusite, quartz, chamotte, mullite, corundum, magnesite, limestone) containing these oxides as important components, are carbothermally reduced and evaporated.

In step (2), the evaporated products are oxidized by mixing with air in the gas stream, and condensed as melt particles.

In step (3), the melt particles are cooled further in the gas stream and solidified to form spherically shaped, metal-oxide powder particles.

In step (4), the powder particles are separated from the stream of gas via a dust filter.

In the flow diagram according to the FIGURE, the individual process steps are denoted in an exemplified implementation of the process as follows:

(A) Weighed portions of the raw materials.

(B) Carbothermal reduction and evaporation at a temperature T of above 2000° C.

(C) Oxidizing of the evaporation products and condensing of the melt particles.

(D) Further cooling of the melt particles in the gas stream and solidification of powder particles.

(E) Dust filter.

In process zone step (A), the components, 1, 2, 3, 4, 5 are portioned by weighing as, respectively, $Al_2O_3$, $SiO_2$, MgO, CaO, and carbon.

Process zone step (B) is carried out in a submerged electric arc furnace, which is open at the top.

In zone step (C), the evaporation products rising upwardly from the furnace are vacuumed off and at the same time intensively mixed with the oxidizing gases 6 and 7 (air and oxygen) and cooled.

In zone step (D), additional air 6 is introduced into the vacuum exhaust system, which further cools the particles.

The powder particles 8 are separated in the dust filter E.

For the favorable execution of the carbothermal reduction and for as intensive an evaporation of the charged materials as possible, it has been found that it is preferable to use petroleum coke as the carbon vehicle, in an amount of 15% to 25% by weight based on the amount of materials charged.

It is important for the formation of the particles and their particle size that following the admixing of air, the concentration of the metal-oxide powder particles in the gas stream is diluted to less than 20 g/Nm³.

The inventors have observed that the hollow-space structure of the particles is based on an increase in density during the rapid transition from the molten to the solid state, and on the retarded solidification of the inner parts compared to the outer layers of the particles.

The presence of transition phase aluminum oxide (gamma-$Al_2O_3$) in the metal-oxide powder particles is surprising and unexpected in light of the fact that transition-$Al_2O_3$-phases do not appear in melt products such as molten mullite, molten spinel, and molten alumina cement.

The particles are usefully separated from the stream of furnace exhaust gas with a hose filter.

The process is excellently suitable for treating ceramic and refractory residual materials if the latter are based on $Al_2O_3$, $SiO_2$, AlN, AlON, SiC, $Si_3N_4$, SiAlON, and ceramic and metal composite materials (e.g. aluminum reinforced by SiC particles or $Al_2O_3$ fibers, Al-bonded $Al_2O_3$, silicon nitride-bonded SiC, or Si-bonded SiC).

Furthermore, residual substances in which fusion products with metallic aluminum and aluminum alloys are present, which occur in melting and casting plants (such as metal-contaminated refractory furnace waste material, and waste material from ceramic filters for liquid-metal, or metal-containing wastes), pose no problems even if such residues are present in a piece size of up to 50 cm.

Furthermore, lump-like refractory residual materials containing free carbon can be treated, such as products based on clay graphite, alumina graphite ($Al_2O_3$—C), for example crucible waste, and waste from foundry stoppers and foundry nozzles.

Other objects and features of the present invention will become apparent from the following Examples, which disclose the embodiments of the present invention. It should be understood, however, that the Examples are designed for the purpose of illustration only and not as a definition of the limits of the invention.

EXAMPLES

For treating various filter bed residual substances from the filtration of aluminum metal (corundum balls and corundum grains, about 0.5 to 3 cm in diameter, cemented by adhering metal residues of an AlMgSi-metal-alloy to a piece size of about 30 cm), a submerged electric arc furnace (about 7 m diameter), which is open at the top, is charged with mixtures of filter bed residual materials, quartz (piece size about 10 cm), magnesite (piece size about 10 cm), limestone (piece size about 10 cm), and petroleum coke (piece size of 2 cm), according to test Nos. 1 to 6. The quantity charged is 1,500 kg per hour. The electric output of the furnace is adjusted to 6 MW.

Evaporation products of all materials charged form instantaneously due to the temperature of the arc. By means of a blower coupled with a hose filter installation, 250000 Nm³ of exhaust gas containing the evaporation products is removed per hour via the furnace. Following re-oxidizing and condensing of the melt particles by mixing with air, the powder particles so produced are separated in the hose filter equipment. The amount of powder particles separated comes to approximately 1,000 kg per hour. This results in a concentration of condensed powder particles of 4 g/Nm³.

Testing of the powder particles produced these following results, as set forth in the following Table, wherein all percents are by weight and are based upon the total composition weight.

The examples Nos. 7 to 9 are powders produced according to the prior art by grinding the starting material, mixing, briquetting, drying, calcining, fusing, cooling, and subsequently crushing, griding and classifying the lump-like fused products.

TABLE

| Test No. | | 1 | 2 | 3 | 4 | 5 | 6 | 7 | 8 | 9 |
|---|---|---|---|---|---|---|---|---|---|---|
| Materials used | | | | | | | | | | |
| calcined bauxite | % | 0 | 0 | 0 | 40 | 40 | 0 | 75 | 50 | 50 |
| Residual bed filter substance | % | 80 | 60 | 40 | 0 | 0 | 70 | 0 | 0 | 0 |
| Quartz | % | 0 | 20 | 40 | 0 | 0 | 0 | 25 | 0 | 0 |

TABLE-continued

| Test No. | | 1 | 2 | 3 | 4 | 5 | 6 | 7 | 8 | 9 |
|---|---|---|---|---|---|---|---|---|---|---|
| Magnesite $MgCO_3$ | % | 0 | 0 | 0 | 40 | 0 | 0 | 0 | 50 | 0 |
| Limestone $CaCO_3$ | % | 0 | 0 | 0 | 0 | 40 | 10 | 0 | 0 | 50 |
| Petroleum coke | % | 20 | 20 | 20 | 20 | 20 | 20 | 0 | 0 | 0 |
| Chemical composition | | | | | | | | | | |
| $Al_2O_3$ | % | 85.3 | 65.9 | 42.4 | 60.9 | 62.1 | 80.1 | 68.5 | 61.4 | 65.2 |
| $SjO_2$ | % | 10.7 | 28.9 | 54.1 | 3.9 | 2.8 | 8.4 | 28.9 | 3.8 | 2.4 |
| MgO | % | 2.6 | 2.6 | 1.3 | 31.8 | 1.6 | 3.2 | 0.1 | 33.7 | 0.8 |
| CaO | % | 0.5 | 0.9 | 0.2 | 0.7 | 30.5 | 5.6 | 0.1 | 0.2 | 29.8 |
| $Fe_2O_3$ | % | 0.3 | 0.6 | 0.1 | 0.4 | 0.3 | 0.3 | 0.5 | 0.4 | 0.7 |
| $Na_2O$ | % | 0.3 | 0.3 | 0.4 | 0.2 | 0.2 | 0.4 | 0.4 | 0.3 | 0.6 |
| $K_2O$ | % | 0.1 | 0.2 | 0.8 | 0.1 | 0.1 | 0.6 | 0.3 | 0.2 | 0.5 |
| C | % | 1.8 | 1.3 | 0.7 | 1.9 | 2.4 | 1.4 | — | — | — |
| Main mineral components (XRD) | | | | | | | | | | |
| Gamma-$Al_2O_3$ | | + | + | + | + | + | + | | | |
| Mullite $3Al_2O_3 \cdot 2H_2O$ | | | | | | | | + | | |
| Spinel $MgO \cdot Al_2O_3$ | | | | | | | | | + | |
| Ca-aluminate $CaO \cdot Al_2O_3$ | | | | | | | | | | + |
| BET-surface | $m^2/g$ | 6.0 | 8.2 | 11.2 | 7.4 | 7.7 | 5.4 | 2.8 | 1.9 | 3.1 |
| Particle distribution (laser granulameter): | | | | | | | | | | |
| Larger than 2 $\mu m$ | % | 27.2 | 22.7 | 45.2 | 24.6 | 25.3 | 27.1 | 15.4 | 24.6 | 19.7 |
| Larger than 0.2 $\mu m$ | % | 98.2 | 98.4 | 99.2 | 97.3 | 98.1 | 96.6 | 80.2 | 85.1 | 84.2 |
| d50 | $\mu m$ | 0.8 | 0.7 | 1.6 | 0.8 | 0.9 | 0.9 | 0.7 | 0.9 | 0.8 |
| Grain shape (TEM): | | | | | | | | | | |
| Spherical | | + | + | + | + | + | + | | | |
| Splintery | | | | | | | | + | + | + |
| Particle density | $g/cm^3$ | 1.3 | 1.0 | 0.3 | 1.0 | 0.9 | 1.2 | 3.1 | 3.6 | 3.2 |
| Processability | | | | | | | | | | |
| Factor water/powder volume | | 0.9 | 0.9 | 0.5 | 0.9 | 0.7 | 0.8 | 1.5 | 1.4 | 1.5 |

While several embodiments of the present invention have been shown and described, it is to be understood that many changes and modifications may be made thereunto without departing from the spirit and scope of the invention as defined in the appended claims.

What is claimed is:

1. Process for producing spherically shaped metal-oxide powder particles comprising the steps of
   (a) reducing aluminum oxide and at least one metal oxide selected from the group consisting of $SiO_2$, MgO and CaO thermally and evaporating to produce evaporated products;
   (b) oxidizing the evaporated products by mixing with air or oxygen in a gas stream, and condensing as melt particles;
   (c) cooling the melt particles further in the gas stream and solidifying to form metal-oxide powder particles; and
   (d) separating the powder particles from the gas stream via a dust filter.

2. Process according to claim 1, comprising
providing an open submerged electric arc furnace for the evaporation; and in said furnace a metered admixturing of oxidizing gases, inert gases and ambient air takes place via an exhaust suction system of the furnace.

3. Process according to claim 1, comprising
providing petroleum coke in the thermal reduction as a carbon vehicle, in an amount of 15% to 30% by weight based on an amount of materials charged.

4. Process according to claim 2, wherein following the mixing with air or oxygen, the gas stream has a concentration of metal-oxide particles less than 20 $g/Nm^3$.

5. Process, according to claim 1, comprising
providing ceramic and refractory residual materials as a starting material, and said starting material contains oxides, nitrides, carbides of aluminum and silicon.

6. Process according to claim 5, comprising
the residual materials contain metallic aluminum and its alloy components.

7. Process according to claim 5,
wherein the residual materials contain free carbon.

8. Process according to claim 5,
wherein the residual materials are present in a size of 1 to 50 cm.

9. Process according to claim 1,
wherein the residual materials are directly converted into a gas phase without prior crushing.

10. Process according to claim 1,
wherein the residual materials are abruptly heated to a temperature of above 2000° C., reduced and evaporated in an arc.

11. Process according to claim 1,
wherein oxidizing and condensing of the particles takes place within 0.5 to 2.5 seconds.

12. The process according to claim 1, wherein the spherically shaped metal-oxide powder particles contain
from 42% to 85% by weight of $Al_2O_3$;
from 2% to 55% by weight of $SiO_2$;
from 0.1% to 34% by weight of MgO;
from 0.1% to 31% by weight of CaO;
from 0.1% to 0.7% by weight of $Fe_2O_3$;
from 0.2% to 0.6% by weight of $Na_2O$;
from 0.1% to 0.8% by weight of $K_2O$; and
from 0.7% to 2.5% by weight of C, with all percents by weight based upon the total particle composition weight.

* * * * *